UNITED STATES PATENT OFFICE.

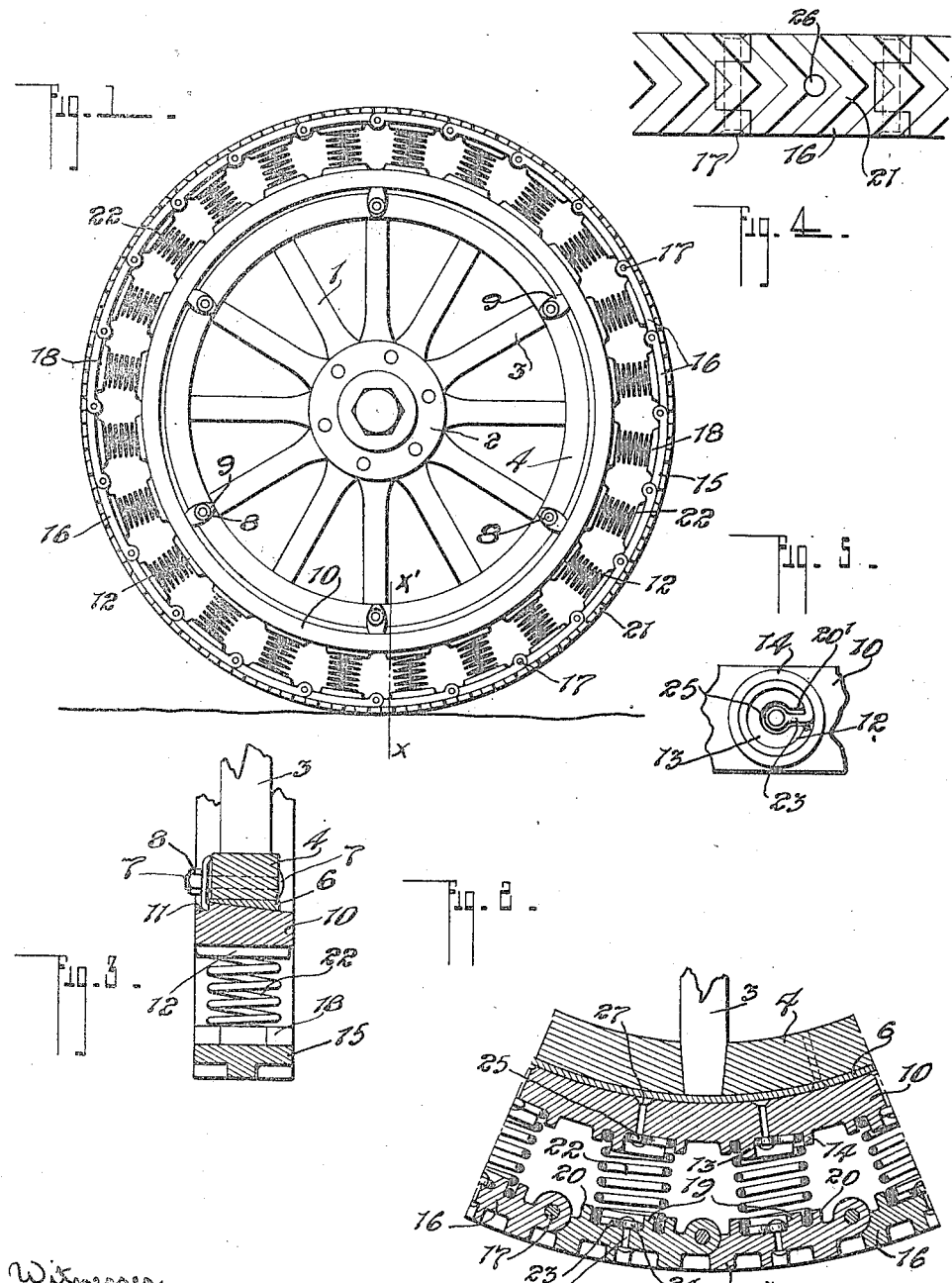

JOHN M. ROSS, OF MAPLE CREEK, SASKATCHEWAN, CANADA.

TIRE FOR VEHICLE-WHEELS.

1,123,597.     Specification of Letters Patent.     Patented Jan. 5, 1915.

Application filed October 27, 1913. Serial No. 797,680.

*To all whom it may concern:*

Be it known that I, JOHN MCINTOSH ROSS, of the village of Maple Creek, in the Province of Saskatchewan, Canada, have invented certain new and useful Improvements in Tires for Vehicle-Wheels, of which the following is the specification.

The invention relates to an improvement in tires for vehicle wheels and the object of the invention is to provide a resilient puncture proof removable tire for a wheel, the tire being inexpensive, durable and simple in construction.

With the above object in view the invention consists essentially in a ring designed to receive the rim of a wheel and be detachably secured to the rim of a wheel, said ring being fitted on the outer face with equal spaced sockets, a metallic tread circumscribing the ring and formed from a number of similar pivotally connected sections, each section presenting a socket on the inner side and spiral springs interposed between the tread and the ring and set in the sockets presented by the tread and the ring, the parts being arranged and constructed as hereinafter more particularly described and later pointed out in the appended claim.

Figure 1 represents a side view of a wheel supplied with my complete tire. Fig. 2 represents an enlarged detailed sectional view through a portion of the tread, the ring and the wheel rim. Fig. 3 represents an enlarged detailed vertical sectional view through the tire, the section being taken in the plane denoted by the line X—X' Fig. 1. Fig. 4 represents a plan view of a portion of the tread. Fig. 5 represents an enlarged detailed plan view of one of the sockets and the spring.

In the drawing like characters of reference indicate corresponding parts in each figure.

1 represents a wheel of ordinary form of which 2 is the hub, 3 the spokes and 4 the rim. The rim carries a wedge shaped band 6 and is fitted at suitable intervals with a number of bolts 7 supplied with adjusting nuts 8 and carrying washers or plates 9. These latter parts are at present found on automobile wheels supplied with demountable rims and form no part of my invention only in so far as they are utilized as a means for holding and locking my detachable tire on the rim.

10 represents a ring designed to fit over the band 6, it being noticed that the inner face of the ring is tapered complementary to the adjoining face of the band and that a shoulder is formed at 11 on the outer side thereof. This shoulder is arranged to receive the outer edges of the plates 9 when the ring is applied on the wheel the inner edges of said plates bearing against the outer face of the rim. By drawing up or tightening the nuts 7 on the bolts the ring is firmly fastened on the rim although it can be readily removed or dismounted by undoing the nuts and turning the plates clear of the shoulders. The outer side of the ring is supplied with a plurality of similar equal spaced sockets 12 formed each from two concentric ribs 13 and 14.

15 represents the tread of the tire which is formed from a number of similar substantially rectangular metallic sections 16, the sections having their ends pivotally connected together as indicated at 17. In the present instance the pivot connection is made by passing a pin through mating or complementary lugs supplied on the connecting ends of the sections. Each section is supplied also on the inner side with a socket 18 formed from concentric ribs 19 and 20. The outer faces of the sections are preferably formed with V-shaped projections 21 providing a traction tread.

22 are spiral springs inserted between the tread and the ring, these springs having their ends received within the sockets presented by the ring and the tread. The springs are permanently secured to the tread and to the ring in the following way. The ends of each spring are turned inwardly as indicated at 23 and fitted with eyes 24 and 25, the eyes resting in each instance within the ribs 13 and 19 it being noticed that said ribs are notched or cut away at 20' to admit the turned in ends of the springs. Rivets 26 and 27 are then passed through the eyes and into the rim and tread respectively, these rivets firmly anchoring the springs.

This tire although metallic is very resilient and cushions the wheel as effectively as a pneumatic tire. It has the advantage over any such tire however in that it is puncture proof and is practically indestructible.

What I claim as my invention is;—

A wheel of the type described, including a ring having upon its outer surface concentric upraised spaced portions forming annular sockets, the inner upraised portions or walls being split, a tread member, and resilient members interposed between said ring and tread, with their inner terminals conformed to and let into said sockets and received within the splits of said socket inner walls or portions, said terminals being centrally secured to said treads and ring, with respect to said sockets, and means on the inner face of said tread member for receiving the outer terminals of the springs.

Signed at Maple Creek this 23rd day of June 1913.

JOHN M. ROSS.

In the presence of—
S. M. GIBBS,
REGINALD W. EYRE.